(12) United States Patent
Birnbaum et al.

(10) Patent No.: US 7,890,336 B2
(45) Date of Patent: Feb. 15, 2011

(54) INTERACTIVE TASK-SENSITIVE ASSISTANT

(75) Inventors: Lawrence Birnbaum, Evanston, IL (US); Kristian Hammond, Chicago, IL (US); Leonard Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 2043 days.

(21) Appl. No.: 10/341,154

(22) Filed: Jan. 13, 2003

(65) Prior Publication Data

US 2004/0138899 A1 Jul. 15, 2004

(51) Int. Cl.
G06Q 99/00 (2006.01)
(52) U.S. Cl. ...................................................... 705/1.1
(58) Field of Classification Search ...................... 705/1, 705/1.1
See application file for complete search history.

(56) References Cited

U.S. PATENT DOCUMENTS

| | | | |
|---|---|---|---|
| 5,305,244 A | | 4/1994 | Newman et al. |
| 5,774,860 A | | 6/1998 | Bayya et al. |
| 5,832,446 A | * | 11/1998 | Neuhaus ........................ 705/1 |
| 5,860,810 A | | 1/1999 | Faul |
| 5,924,069 A | | 7/1999 | Kowalkowski et al. |
| 5,963,940 A | * | 10/1999 | Liddy et al. .................... 707/5 |
| 5,983,200 A | * | 11/1999 | Slotznick ...................... 705/26 |
| 6,173,266 B1 | | 1/2001 | Marx et al. |
| 6,236,974 B1 | * | 5/2001 | Kolawa et al. ................. 705/7 |
| 6,285,932 B1 | | 9/2001 | de Bellefeuille et al. |
| 6,356,869 B1 | | 3/2002 | Chapados et al. |
| 6,418,440 B1 | | 7/2002 | Kuo et al. |
| 6,477,437 B1 | | 11/2002 | Hirota |
| 6,728,681 B2 | * | 4/2004 | Whitham .................... 704/275 |
| 7,136,819 B2 | * | 11/2006 | Whitham .................... 704/275 |
| 2002/0029149 A1 | * | 3/2002 | Nishina ......................... 705/1 |
| 2002/0107433 A1 | * | 8/2002 | Mault ......................... 600/300 |
| 2002/0171674 A1 | * | 11/2002 | Paris ........................... 345/700 |
| 2003/0043144 A1 | * | 3/2003 | Pundarika et al. ........... 345/419 |

OTHER PUBLICATIONS http://216.239.51.104/search?.../speechwear.html+&hl=en
&ie=UTF- May 13, 2003 CMU SpeechWear p. 1-2.
http://research.sun.com/speech/projects/SpeechActs/ May 14, 2003 Sun Labs Speech Group; SpeechActs p. 1-2 Speechacts Overview.
Technische Universitat Munchen, "Enabling Speech in Interactive" Oliver Creighton p. 1-155.

* cited by examiner

Primary Examiner—Jonathan Ouellette
(74) Attorney, Agent, or Firm—McDermott Will & Emery LLP

(57) ABSTRACT

A system and method in accordance with the present invention include means for providing interactive assistance for the performance of a set of predefined steps, including selecting the set of predefined steps and automatically generating a step-sensitive grammar for each step. Generating the step-sensitive grammar includes generating a set of navigation commands related to each step and generating a set of rules to recognize potential queries related to each step. A recognizer is configured for determining if a received utterance forms one of the navigation commands or one of the potential queries, within a context of the current step. Form this determination, provided are navigation to a different step if the utterance was a navigation command or a response if the utterance was a query.

3 Claims, 5 Drawing Sheets

US 7,890,336 B2

INTERACTIVE TASK-SENSITIVE ASSISTANT

STATEMENT OF GOVERNMENT INTEREST

The U.S. Government has no interest in or to the present invention.

CROSS REFERENCES TO RELATED APPLICATIONS

There are no prior related patent applications.

1. Field of the Invention

The inventive concepts relate to systems and methods useful for assisting a user in the performance of tasks. More specifically, the inventive concepts relate to systems and methods for providing interactive and task sensitive assistance to the user in performance of such tasks.

2. Background

Like many processes, cooking can be a complicated task involving a myriad of actions and decisions that often need to be performed under strict constraints of time, space, and attention. When someone is learning to cook, he follows the instructions in a cookbook, or a recipe. However, the cookbook takes up valuable countertop space, it can be difficult to turn pages of a cookbook when hands are occupied or dirty, and it is hard to keep track of where you are in the recipe. Then, there is also the problem of running around the kitchen between reading each step of the recipe. All this commotion can be highly stressful and intimidating for the novice cook, or in some cases even for an experienced cook learning a new recipe. Often the only solution is to have someone else present to read the recipe or to just make the best of it.

Individuals performing similar tasks can be faced with the same challenges. For example, vehicle repair, surgery or other medical treatments, mechanical device operation, maintenance activities, installation activities, building or assembly projects, or any number of training or operational activities can all be complicated and highly demanding of the individual or individuals performing the tasks.

Presently, systems are not available to assist an individual or individuals in such a situation. In order to be effective, any system that is designed to help a user under these conditions has to be both sensitive to the constraints of such tasks and actually able to exploit them. This means not only facilitating a hands-free or even visually inattentive interaction, but also attending to the details of the task itself.

SUMMARY OF THE INVENTION

A system and method in accordance with the present invention include means for providing interactive assistance for the performance of a set of predefined steps, including selecting the set of predefined steps and automatically generating a step-sensitive grammar for each step in a given set of steps. Generating the "step-sensitive" grammar includes identifying a set of navigation commands related to each step and generating a set of rules to recognize potential queries related to each step. A recognizer is configured for determining if a received utterance forms one of said set of navigation commands or one of said potential queries, within a context of the current step. With this determination made, provided are navigation to a different step if the utterance was a navigation command or a response if the utterance was a query.

As will be appreciated by those skilled in the art, a system in accordance with the present invention could be implemented in any of a variety of contexts wherein a predefined set of steps must be accomplished and where intelligent interaction would be useful in assisting an individual performing those steps. For instance, a system in accordance with the present invention could be used to guide individuals in cooking using a recipe, car repair, surgery or other medical treatments, mechanical device operation, maintenance activities, installation activities, building or assembly projects, or in any number of training activities.

In accordance with the present invention, the gap between having an on-site instructor or assistant and, for example, watching a TV show or video, or simply using a manual or cookbook, is bridged. Such a system walks a user (or group of users) through a selected set of steps (e.g., a recipe), reading aloud each step, and displaying, and optionally highlighting, relevant instructions and/or diagrammatic information on a display device. Since the system is voice-controlled, the user's hands are free to perform the specified tasks. Furthermore, the system maintains an awareness of the context associated with all points throughout the process of performing the steps. This context sensitivity increases the accuracy and precision of speech recognition. The result is a system that emulates the behavior of a human instructor or assistant.

The present interactive system can act intelligently, since it knows what the user is doing and why she is doing it, at all possible times. Generally, the more a system understands the context surrounding a situation, the more helpful and knowledgeable it can be. However, it can be very difficult to figure out the context of a particular situation at any given time. The system would have to know an incredible amount of information about the world it lives in. Unlike other systems, in the present invention, the system knows the environment, i.e., the context of the situation is established by the system itself. More specifically, such an interactive system has an easier time tracking a user doing a task because the system is actually guiding the user through the steps. In this circumstance, the system knows when the user is doing something, why the user is doing it, and what s/he is trying to accomplish. This makes it possible for the system to better provide helpful, insightful, and intelligent information.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

For illustrative purposes, the present invention is described with respect to a system for implementing steps in a recipe, but those skilled in the art will appreciated that the present invention could be implemented in systems useful in any of a variety of contexts wherein a predefined set of steps must be accomplished and where intelligent interaction would be useful in assisting an individual (or individuals) performing those steps. Such a system preferably includes a processing device having a graphical user interface capable of presenting text, audio and video content, along with means for voice interaction by a user (or users).

In the preferred form, the system includes a large searchable database of recipes or instructions and/or may have such available from one or more on-line sources, e.g., via the Internet. The user can specify (e.g., by voice or keyboard input) search terms for the recipe title, the type of food, and/or the ingredients in order to find a recipe or other instruction sequence. Once the user selects a recipe, the system renders the recipe on a display, such as display 100 shown in FIG. 1. Other manners of searching for and opening a recipe file may also be provided, such as other known methods used for typically searching and opening files. In the preferred form, display 100 includes a recipe window 110 having the numbered steps of the recipe and user selectable ingredients window mechanism 120, which causes a window to be rendered having a listing of the recipe's ingredients. The recipe title 102 may also be displayed for some or all of the user's session. In other embodiments, the ingredient and recipe display contents could be merged into a single window, perhaps has different panes, or they could be provided in separate displays.

Figure 1:
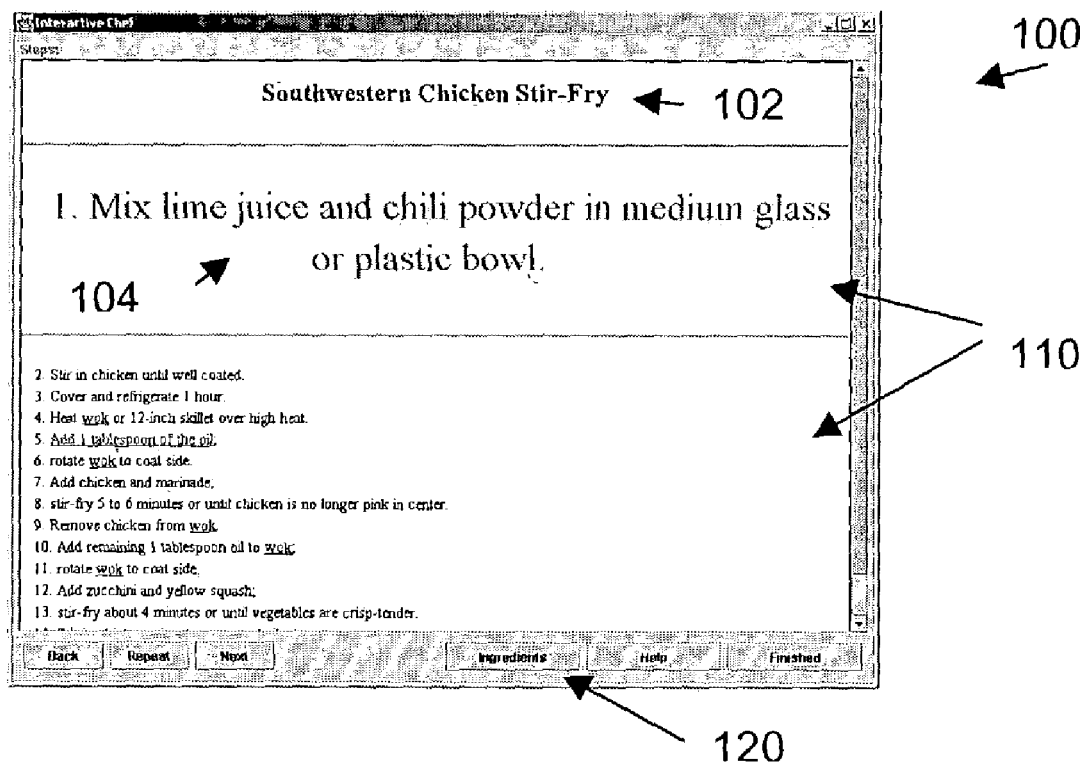
FIG. 1 is a representative display of a screen that may serve as part of the user interface for a system in accordance with the present invention.

The system supports interaction with respect to a variety of types of user questions or queries. As examples, if the user has questions regarding the ingredients needed for the step, he may ask the system to tell him how much of an ingredient is needed or to show him the entire list of ingredients again. If a video demonstration is available for elements of the step, the system will notify the user verbally and/or visually and will play the video upon request. The system could be configured to play the video in the same window or in a new window. Preferably, the system also includes other visual cues to help facilitate the user's interaction with the system. For example, in the preferred form, the current step 104 is set apart from the other steps, and the techniques with help available are highlighted (e.g., underlined), as is shown in FIG. 1.

The user can speak a variety of commands, such as "I'm ready" or "Let's begin" to start the cooking process. At each step, the user speaks to the system naturally and unaffectedly, as he would to another human being. This way, the user is in control of the speed at which he moves through each step. An example of a transcript for a typical interaction between a user and the system is provided below:
    System: Welcome to The Interactive Cooking System. What do you want to cook today? {User selects recipe}
    System: Please wait. Preparing recipe.
    System: Let's get cookin'!
    User: I'm ready.
    System: Mix lime juice and chili powder in medium glass or plastic bowl.
    User: How much lime?
    System: You need 2 tablespoons of lime juice.
    User: Okay, now what?
    System: Stir in chicken until well coated.
    . . .
    System: Cover and refrigerate 1 hour.
    User: Wait, what?
    System: Cover and refrigerate 1 hour.
    User: Can you show me the ingredients? {Ingredients window pops up}
    User: Great thanks. {Ingredients window closes}
    User: What's next?
    System: Heat wok or 12-inch skillet over high heat. There is help available for wok.
    User: What is that? {Video window pops up}
    User: {During video} Start over. {Video starts over}
    User: Thanks, that was helpful. {Video window closes}
    User: Ok, got it.
    System: Add 1 tablespoon of the oil. There is help available for add 1 tablespoon of the oil.
    User: How do I do that? {Video window pops up}
    User: {During video} Pause. {Video pauses}
    User: Play. {Video continues}
    User: Close. {Video window closes}
    . . .
    System: Remove chicken from wok.
    User: What was the last step again?
    System: Stir-fry 5 to 6 minutes or until chicken is no longer pink in center.
    User: What do I do now?
    . . .
    User: All done, thanks. {Cook window closes}
    System: Good job, it looks yummy!

The system is able to achieve this type of highly natural and responsive interaction with a user because instead of using a large general dictionary for dictation and then analyzing all of the spoken words uttered by the user, the system starts from the other end of the spectrum with the relatively small rule-based grammar set, custom generated for each step in the recipe. This significantly reduces the system's speech recognition processing needs by tailoring these needs to the task at hand.

Generally, in the preferred form, there are two functional modules of the system, a grammar generator (or recipe pre-processor) and a "recognizer". The grammar generator performs initial analysis of the recipe, including preparing the step-sensitive grammar for use by the recognizer during performance of the steps. Once the user has selected a recipe to prepare, the grammar generator tasks include:

1. Analysis of each recipe step to discover where help video and ingredient queries could take place. This involves cross-referencing keywords and phrases from each step with supported video keywords and the list of ingredients available to the recognizer from one or more databases or systems.
2. Generation of custom grammar (e.g., grammar files) for each step. Each of these grammars includes the acceptable commands and queries per step.

Figure 2:
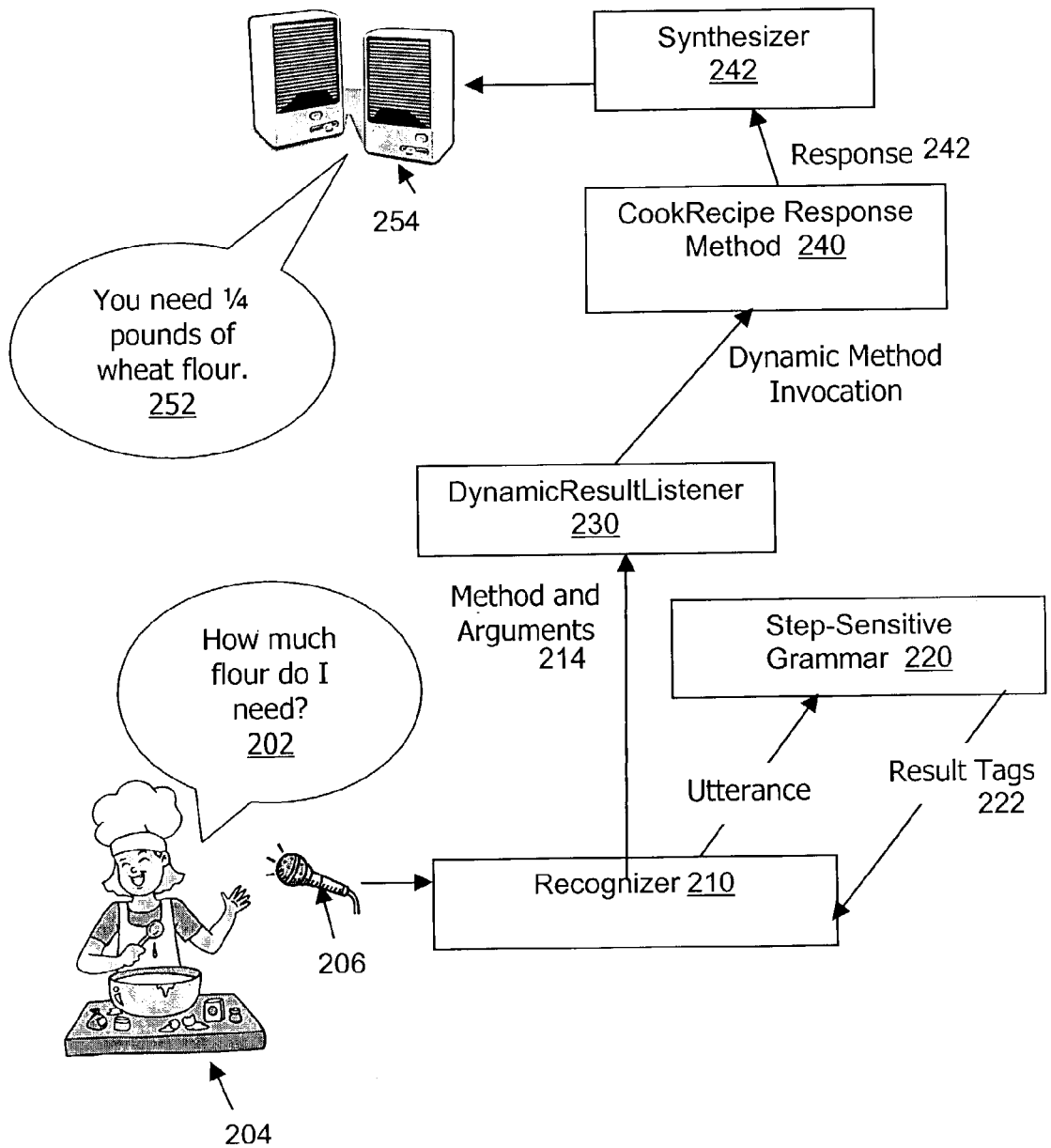
FIG. 2 is a functional flow diagram of interaction between a user and a system facilitated by the screen of FIG. 1.

During cooking, the system follows the process 200 illustrated in FIG. 2. However, those skilled in the art will appreciate that other functional modules and processes may be defined or used to implement the present invention, and that the present invention is not limited to the modules shown or referred to herein or to the process 200 of FIG. 2. The recognizer 210 detects valid queries (or utterances) 202 from a user 204 (via microphone 206) and translates them to text, which the recognizer 210 parses. Applying the step-sensitive grammars 220 prepared by the recipe pre-processor's grammar generator to the parsed text 212, the recognizer 210 obtains result tags 222 expressing the essence of the user's utterance. As an example, if the user asked the question "How much flour do I need" 202, application of the step sensitive grammar 220 produces two result tags 222: "askQuantity" and "flour".

In the preferred form, the system is primarily comprised of Java modules, and uses IBM's ViaVoice Millennium Pro with Speech for Java SDK as speech to text application and generates step-sensitive grammar as Java Speech Grammar Format (JSGF) files. However, once again, the present invention need not be implemented in Java, nor with the third party products mentioned herein. Using Java's reflection abilities, the recognizer 210 is able to dynamically invoke different methods based on that query. In this case, "askQuantity" is the method to be invoked and "flour" is an argument to that method. Recognizer 210 passes the methods and arguments 214 to a dynamic result listener 230, which invokes a response method 240, which in turn obtains the response 242 to the user's utterance 202.

Some processing may occur within the methods in order to determine the correct response. The response is a function of the context provided by the step being processed when the utterance was received by recognizer 210. Accordingly, response method 240 searches for responses according to the step-sensitive grammar for the current step. Once response 242 is determined, a speech synthesizer 250 generates an audio speech output thereof 252. Other interactions, such as navigation of the recipe or asking for assistance with a particular technique, are handled in a similar way. In this embodiment, the response is output as the speech phrase "You need ¼ pounds of wheat flour." 252 (via speakers 254).

Figure 3:
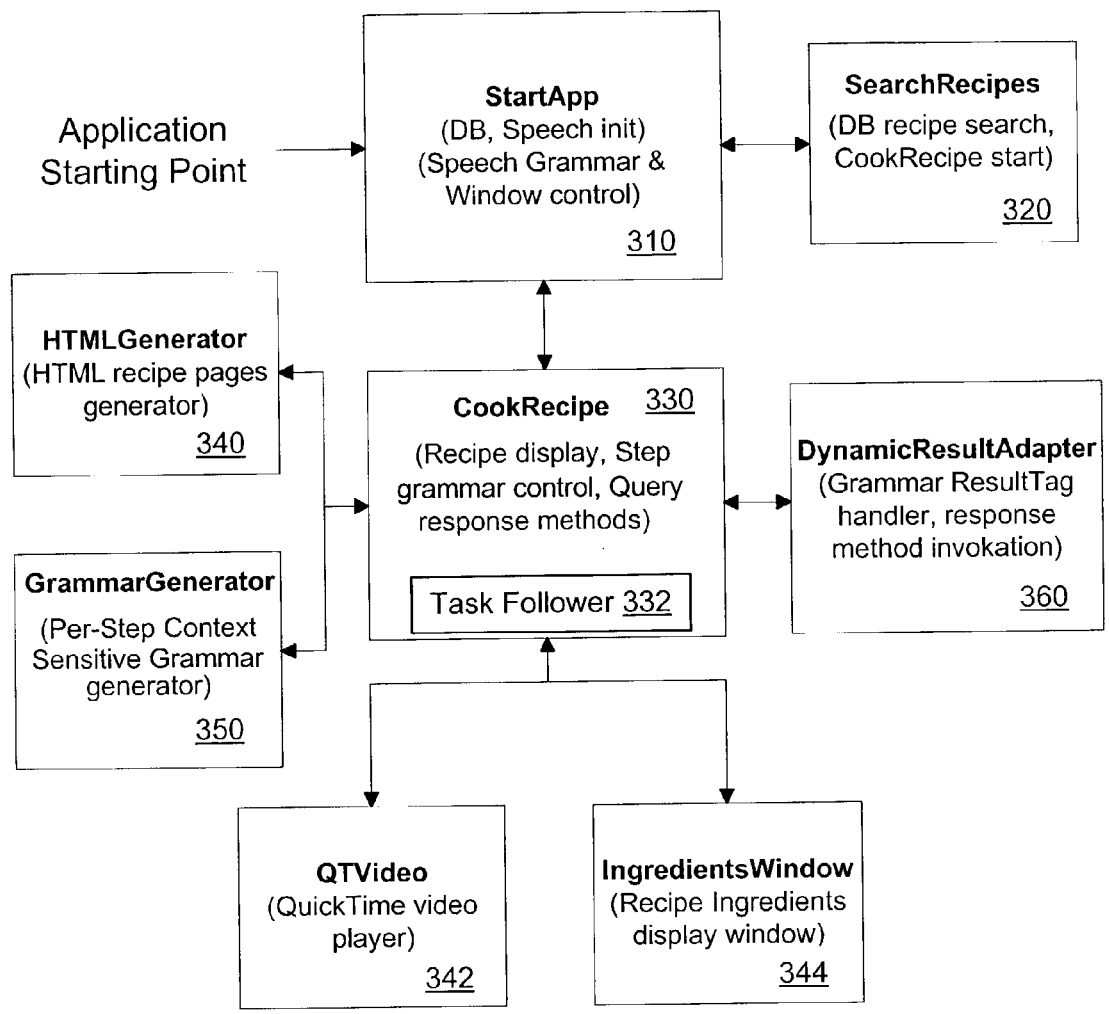
FIG. 3 is a block diagram of an illustrative software architecture for a system in accordance with the present invention.

A software architecture 300 showing one embodiment of the primary functional modules of a system in accordance with the present invention, for example as is provided in FIG. 2, is shown in FIG. 3. As will be appreciated by those skilled in the art, the present invention may be implemented using other architectures, and in any of a number of combinations of software, hardware and firmware. Architecture 300 includes a StartApp module 310 that initializes the system application, including initializing the speech-to-text application and provides general window control, access to system data sources and other system functionality. StartApp module 310, for example, initiates a SearchRecipes module 320 to search for recipes from recipe data sources, in response to a user's request.

A CookRecipe module 330 serves as a central control module for the system. CookRecipe module 330 includes task follower 332 that manages the interaction with the user. The task follower 332, tasks a HTML generator 340 to provide recipe pages suitable for display, a QTVideo (or Quick Time Video) module 342 for playing selected videos, and an IngredientsWindow module 344 for rendering a window having the recipe's ingredients. The task follower 332, in conjunction with the HTMLGenerator 340, highlights each step on the screen, causes it to be output as audio (or read aloud), and then awaits (or listens for) the user's next utterance. The user may communicate with the system by speaking to it, using a commercial speaker-independent (i.e., untrained) speech recognition system (currently IBM Via Voice).

In the preferred form, the user's utterances can serve at least three (3) purposes: navigation through the task, questions about the ingredients, or help with a technique or in the use of a utensil or tool. The user may indicate navigation commands both explicitly (e.g., "go on," "next step please," "go back a step," etc.) as well as implicitly (e.g., "OK," "uh-huh, got it," etc.). The user can ask for more information about ingredients, in particular asking for quantity information or more general information (e.g., "How much salt?" or "Tell me about the broccoli again," etc.). The user can also ask for help regarding a particular technique (e.g., "How do I do that?" or "How do I saute the onions?") or in the use of a particular utensil or implement (e.g., "How do I use a wok?"). The system highlights the names of utensils or techniques for which it has help available, such as in the display 100 of FIG. 1. When asked for help, the system displays short videos or illustrations with audio presenting the proper technique or use, e.g., using QTVideo module 342. The presentation system is also voice-controlled and supports general navigation and control commands (e.g., "stop," "continue," "close," etc.). Help information is not hard-wired to particular recipe steps. Rather, help is characterized by key-words when entered, and these key-words are correlated with words in the recipes when they are prepared for use, which can be done either upon request or in a batch prior to use of the system.

Figure 4:
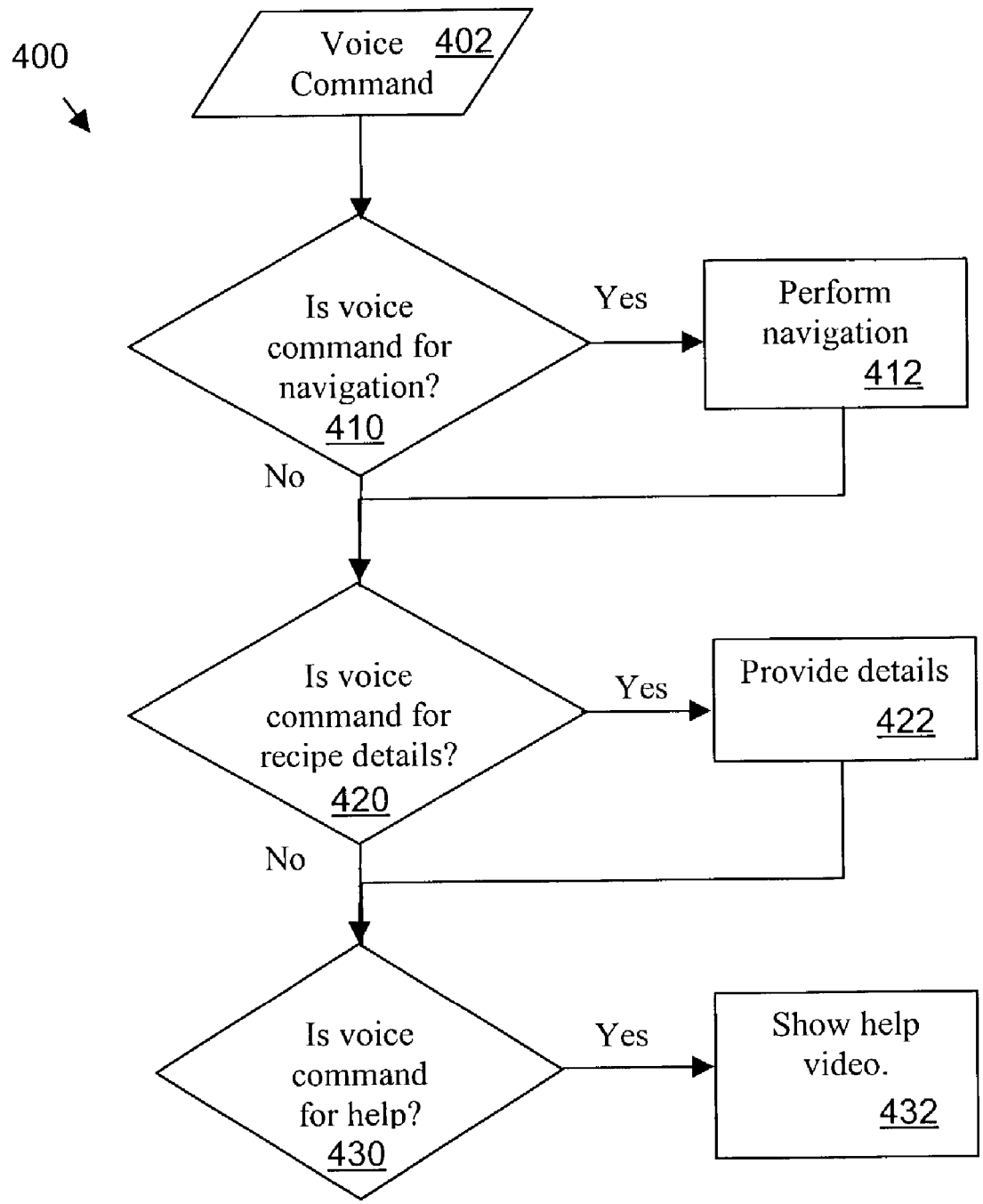
FIG. 4 is a flow diagram of a process for processing voice commands by the architecture of FIG. 3.

FIG. 4 provides a top-level flow diagram 400 of the processing of user voice commands by the task follower 332. Initially, a vice command 402 is received. In step 410, a test is performed on the text form of the command to determine if the command is a navigation command and, if so, the navigation is performed or initiated by, in step 412, task follower 332. If the test in step 410 was negative, the process continues to step 420, where a test is performed to determine if the command is a request for recipe details. And, if so, details are provided in step 422, e.g., by DynamicResultAdapter 360, which is tasked by task follower 332. If the test in step 420 was negative, the process continues to step 430, where a test is performed to determine if the command is a request for help. And, if so, help is provide in step 432, e.g., by a video launched by QTVideo 342, which is tasked by task follower 332.

Figure 5:
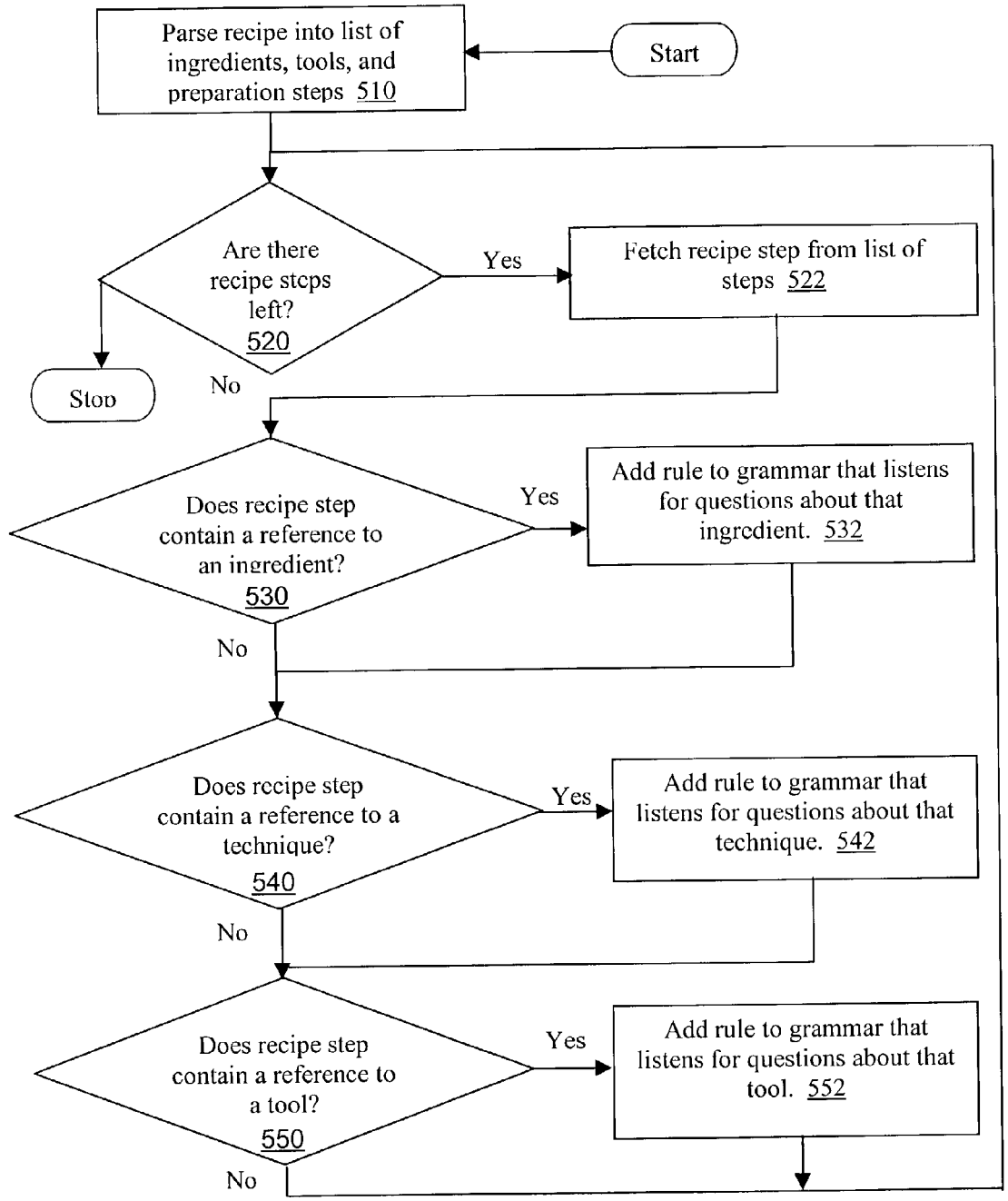
FIG. 5 is a flow diagram of a process for generating step-sensitive grammars by the architecture of FIG. 3.

Grammar generator 250 is the portion of the system that automatically generates grammars for each step of the recipe. An illustrative process for generating grammars is shown in FIG. 5. Step 510 includes parsing a selected recipe into a list of ingredients, tools, and preparation steps. As examples, the parser may be provided as part of the Grammar generator 250, CookRecipe module 330, or could be a standalone module accessed by either of the foregoing. In step 520, a determination is made of whether there are any recipe steps left for which a step-sensitive grammar must be generated. If there are, a recipe step is chosen from the list of recipe steps, in step 522.

In step 530, a determination is made of whether the recipe step includes a reference to an ingredient. If so, a rule is added to the grammar that "listens" for queries about that ingredient, in step 532. As an example, such a query could be "How much X?" where X is the ingredient in question. From either of steps 530 or 532, the process continues to step 540, where a determination is made of whether the recipe step includes a reference to a certain technique (e.g., stir-fry). If so, a rule is added to the grammar that listens for queries about that technique, in step 542. As an example, such a query could be "How do I X?" where X is a technique. From either of steps 540 or 542, the process continues to step 550, where a determination is made of whether the recipe step includes a reference to a tool (e.g., wok). If so, a rule is added to the grammar that listens for queries about that tool, in step 552. As an example, such a query could be "How do I use the X?" where X is a tool. This process continues for each step in the recipe, until a step-sensitive grammar is formed for each recipe step.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

For example, the system can be (and has been) generalized to a variety of tasks similar to cooking, such as auto maintenance and gardening, as well as other maintenance and operational tasks generally. The techniques for generating the grammar for each step described above can be generalized by noting that repair and operational tasks typically have analogs to ingredients (e.g., parts, work in progress, etc.), utensils (e.g., tools), and of course have techniques or steps. The grammars could be extended to enable questions about a wider variety of help topics, e.g., "What does/should X look like?" where X is an ingredient, a part, or a work in progress. As a general rule, regardless of the field, one could consider the things operated on elements, the things used to operate on them tools, and the methods used techniques.

As examples, devices which may be useful in implementing the present invention include, but are not limited to, personal computers (including laptop computers), personal digital assistants, interactive television devices, appropriately enabled cellular telephones, or other such devices that may be specifically configured to implement the present invention. Such devices could also be integral with kitchen appliances. Such devices may be network enabled and capable of accessing content (e.g., recipes) and functionality via a network. For example, in some forms, a user could download a recipe to the device from the Web and then execute the system functionality locally on the device for the downloaded recipe. Or, the device could accept or obtain content (e.g., recipes and videos) and execute functionality from transportable media, such as CD ROM or DVD.

What is claimed is:

1. A machine-executed method of providing interactive assistance for the performance of a set of predefined steps, said method comprising:
    A. accessing data related to the set of predefined steps, and for each of one or more steps from said set of predefined steps, automatically generating a grammar, including:
        1) generating a set of navigation commands related to the step, based on a context of the step; and
        2) generating a set of rules to recognize potential queries related to the step, based on the context of the step;
    B. providing a recognizer configured for determining if a received vocal utterance corresponds to one of said set of generated navigation commands or one of said potential queries related to a current step according to the generated rules, within a context of said current step; and
    C. navigating to a different step from the current step if said vocal utterance is a navigation command corresponding to at least one of the generated navigation commands or providing a response if said vocal utterance is a query corresponding to one of said potential queries according to the generated rules.

2. A machine-executed method of generating step-sensitive grammars for a recipe, including:
    A. parsing the recipe into a set of steps;
    B. selecting a recipe step from the set of steps; and
    C. generating a grammar comprising a set of rules, including;
        1) determining if the recipe step includes an ingredient reference and, if so, adding to said grammar a rule that recognizes the ingredient in a query;
        2) determining if the recipe step includes a technique reference and, if so, adding to said grammar a rule that recognizes the technique in said query;
        3) determining if the recipe step includes a tool reference and, if so, adding to said grammar a rule that recognizes the tool in said query; and
        4) repeating 1), 2), and 3) for each ingredient, technique, and tool referenced in said recipe step;
    D. repeating steps B and C for each step in said recipe.

3. The method of claim 2 further comprising:
    E. providing a recognizer configured for determining if a received vocal utterance corresponds to one of the generated set of rules related to a current step, within a context of said current step; and
    F. if said vocal utterance corresponds to one of the generated rules related to the current step, providing a response to the vocal utterance based on a type of the rule.

* * * * *